United States Patent
Matikainen

(10) Patent No.: US 11,525,987 B2
(45) Date of Patent: Dec. 13, 2022

(54) OPTICAL DEVICE FOR MODIFYING LIGHT DISTRIBUTION

(71) Applicant: LEDIL OY, Salo (FI)

(72) Inventor: Yrjö-Sakari Matikainen, Salo (FI)

(73) Assignee: LEDIL OY, Salo (FI)

( * ) Notice: Subject to any disclaimer, the term of this patent is extended or adjusted under 35 U.S.C. 154(b) by 0 days.

(21) Appl. No.: 17/297,648

(22) PCT Filed: Oct. 24, 2019

(86) PCT No.: PCT/FI2019/050762
§ 371 (c)(1),
(2) Date: May 27, 2021

(87) PCT Pub. No.: WO2020/109652
PCT Pub. Date: Jun. 4, 2020

(65) Prior Publication Data
US 2021/0396980 A1      Dec. 23, 2021

(30) Foreign Application Priority Data
Nov. 29, 2018   (FI) .................................... 20186008

(51) Int. Cl.
*G02B 19/00*   (2006.01)
*F21V 7/09*    (2006.01)
(Continued)

(52) U.S. Cl.
CPC ............ *G02B 19/0028* (2013.01); *F21V 7/09* (2013.01); *G02B 5/3066* (2013.01); *G02B 19/0061* (2013.01); *F21Y 2115/10* (2016.08)

(58) Field of Classification Search
CPC .............. G02B 19/0028; G02B 5/3066; G02B 19/0061; F21V 7/09; F21V 9/00;
(Continued)

(56) References Cited

U.S. PATENT DOCUMENTS 2,215,900 A * 9/1940 Bitner ..................... F21V 13/04
362/333
4,623,225 A    11/1986 Forkner
(Continued)

FOREIGN PATENT DOCUMENTS

| CN | 108240607 | 7/2017 |
|----|-----------|--------|
| EP | 3 287 694 | 2/2018 |
| JP | 4989658   | 8/2012 |

OTHER PUBLICATIONS

International Search Report for PCT/FI2019/050762 dated Feb. 19, 2020, 3 pages.
(Continued)

Primary Examiner — Bao Q Truong
(74) Attorney, Agent, or Firm — Nixon & Vanderhye

(57) ABSTRACT

An optical device includes a reflector-section that includes a light-ingress surface for receiving light from a light source, a reflector surface for reflecting the light based on total internal reflection, and a light-egress surface through which the reflected light exits the optical device. When the light source is at a predetermined position with respect to the optical device, an angle of incidence ($\theta_i$) of the light at the light-egress surface is a polarization angle at which a p-polarized component of the light is transmitted through the light-egress surface without being reflected by the light-egress surface. Thus, unwanted reflections at the light-egress surface can be reduced and thereby unwanted scattering of light is reduced while having good transmitting efficacy.

20 Claims, 3 Drawing Sheets

(51) Int. Cl.
*G02B 5/30* (2006.01)
*F21Y 115/10* (2016.01)

(58) Field of Classification Search
CPC ... F21V 5/00; F21V 5/04; F21V 5/045; F21V 5/046; F21V 5/048; F21Y 2115/10
See application file for complete search history.

(56) References Cited

U.S. PATENT DOCUMENTS

| | | | |
|---|---|---|---|
| 4,767,172 A * | 8/1988 | Nichols | G02B 6/4214 |
| | | | 355/1 |
| 5,233,466 A | 8/1993 | Maeda et al. | |
| 2015/0219313 A1* | 8/2015 | Marcaly | F21V 13/04 |
| | | | 362/327 |
| 2016/0215956 A1 | 7/2016 | Smith et al. | |
| 2017/0038511 A1 | 2/2017 | Stormberg et al. | |

OTHER PUBLICATIONS

Written Opinion of the ISA for PCT/FI2019/050762 dated Feb. 19, 2020, 9 pages.
Finnish Search Report for FI 20186008 dated Jun. 17, 2019, 2 pages.

* cited by examiner

OPTICAL DEVICE FOR MODIFYING LIGHT DISTRIBUTION

CROSS-REFERENCE TO RELATED APPLICATIONS

This application is the U.S. national phase of International Application No. PCT/FI2019/050762 filed Oct. 24, 2019 which designated the U.S. and claims priority to FI 20186008 filed Nov. 29, 2018, the entire contents of each of which are hereby incorporated by reference.

FIELD OF THE DISCLOSURE

The disclosure relates generally to illumination engineering. More particularly, the disclosure relates to an optical device for modifying a distribution of light produced by a light source that may comprise, for example but not necessarily, one or more light emitting diodes "LED".

BACKGROUND

Distribution of light produced by a light source can be important or even critical in some applications. The light source may comprise, for example but not necessarily, one or more light emitting diodes "LED", one or more filament lamps, or one or more gas-discharge lamps. The distribution of light produced by a light source can be modified with optical devices such as lenses, reflectors, and combined lens-reflector devices that comprise sections which act as lenses and sections which act as reflectors. FIG. 1a shows a section view of an exemplifying optical device 101 according to the prior art for modifying a distribution of light radiated by a light source 102. Some of light beams radiated by the light source 102 are depicted with dashed-line arrows in FIG. 1a. The optical device 101 is made of suitable transparent material whose refractive index is greater than one. The optical device 101 can be rotationally symmetric with respect to a geometric line 120 shown in FIG. 1a. The geometric line 120 is parallel with the z-axis of a coordinate system 199. The optical device 101 comprises a light-ingress surface 103 for receiving light from the light source 102 and a reflector surface 104 for reflecting the light received through the light-ingress surface 103 so that total internal reflection "TIR" takes place when the light arrives at the reflector surface 104. The optical device 101 further comprises a light-egress surface 105 for the reflected light and for light received through a light-ingress surface 106.

An inconvenience related to an optical device of the kind described above is that a part of light is reflected at a light-egress surface through which the main part of the light exits the optical device. In FIG. 1a, reflections at the light egress surface 105 are depicted with dash-and-dot line arrows. The reflectance R is $(1-n)^2/(1+n)^2$ when a light beam arrives perpendicularly at the light-egress surface 105, where n is the refractive index of the transparent material of the optical device 101. For example, the refractive index of glass is about 1.5 and thus the reflectance R is about 4% when light arrives perpendicularly at a glass-to-air interface. Therefore, if the transparent material of the optical device 101 is glass, the light-egress surface 105 reflects about 4% of the light arriving at the light-egress surface 105. In many cases, a corollary of reflections at a light-egress surface is that a light distribution pattern produced with an optical device deviates from a desired light distribution pattern. FIG. 1b shows the light distribution pattern produced with the optical device 101 as a function of a polar angle $\varphi$. The polar angle $\varphi$ is presented in FIG. 1a. As shown in FIG. 1b, the light distribution pattern comprises side peaks which are undesirable in many cases.

SUMMARY

The following presents a simplified summary in order to provide a basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

In this document, the word "geometric" when used as a prefix means a geometric concept that is not necessarily a part of any physical object. The geometric concept can be for example a geometric point, a straight or curved geometric line, a geometric plane, a non-planar geometric surface, a geometric space, or any other geometric entity that is zero, one, two, or three dimensional.

In accordance with the invention, there is provided a new optical device for modifying a distribution of light produced by a light source.

An optical device according to the invention is a single piece made of transparent material and the optical device comprises a reflector-section comprising:

a light-ingress surface for receiving light from a light source,
  a reflector surface for reflecting, based on total internal reflection, the light received through the light-ingress surface, and
  a light-egress surface for the reflected light.

The light-ingress surface, the reflector surface, and the light-egress surface of the reflector-section are shaped so that an angle of incidence of the reflected light arriving at the light-egress surface is substantially a polarization angle when the light source is located at a predetermined position with respect to the optical device. The polarization angle is an angle of incidence at which a p-polarized component of the above-mentioned light is transmitted through the light-egress surface without being reflected by the light-egress surface. The polarization angle is also known as the Brewster's angle. The angle of incidence is between a beam of the above-mentioned light and a geometric normal of the light-egress surface, and a polarization direction of the p-polarized component of the above-mentioned light is parallel with a geometric plane of incidence defined by the geometric normal of the light-egress surface and the beam of the above-mentioned light.

As the above-mentioned angle of incidence is substantially the above-mentioned polarization angle i.e. the Brewster's angle, unwanted reflections at the above-mentioned light-egress surface can be reduced and thereby unwanted scattering of light is reduced while having good transmitting efficacy. The light-ingress surface, the reflector surface, and the light-egress surface of the reflector-section of the optical device are shaped advantageously so that the above-mentioned angle of incidence is substantially the polarization angle on at least 75% of the light-egress surface through which all the reflected light exits the optical device, when the light source is located at the predetermined position with respect to the optical device.

In accordance with the invention, there is provided also a new illumination device that comprises:

a light source, and an optical device according to the invention for modifying a distribution of light produced by the light source.

The light source is located with respect to the optical device so that an angle of incidence of light arriving at the light-egress surface of the optical device from the reflector surface of the optical device is a polarization angle at which a p-polarized component of the above-mentioned light is transmitted through the light-egress surface without being reflected by the light-egress surface.

The light source of the illumination device may comprise for example one or more light emitting diodes "LED".

In accordance with the invention, there is provided also a new mold having a form suitable for manufacturing, by mold casting, a piece of transparent material, e.g. plastic, having a shape of an optical device according to the invention.

Various exemplifying and non-limiting embodiments of the invention are described in accompanied dependent claims.

Exemplifying and non-limiting embodiments of the invention both as to constructions and to methods of operation, together with additional objects and advantages thereof, will be best understood from the following description of specific exemplifying embodiments when read in conjunction with the accompanying drawings.

The verbs "to comprise" and "to include" are used in this document as open limitations that neither exclude nor require the existence of also un-recited features. The features recited in dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF THE FIGURES

Exemplifying and non-limiting embodiments and their advantages are explained in greater detail below with reference to the accompanying drawings, in which:

FIGS. 1a and 1b have already been explained in the Background-section of this document.

DESCRIPTION OF EXEMPLIFYING AND NON-LIMITING EMBODIMENTS

The specific examples provided in the description given below should not be construed as limiting the scope and/or the applicability of the appended claims. Lists and groups of examples provided in the description given below are not exhaustive unless otherwise explicitly stated.

Figure 2A:
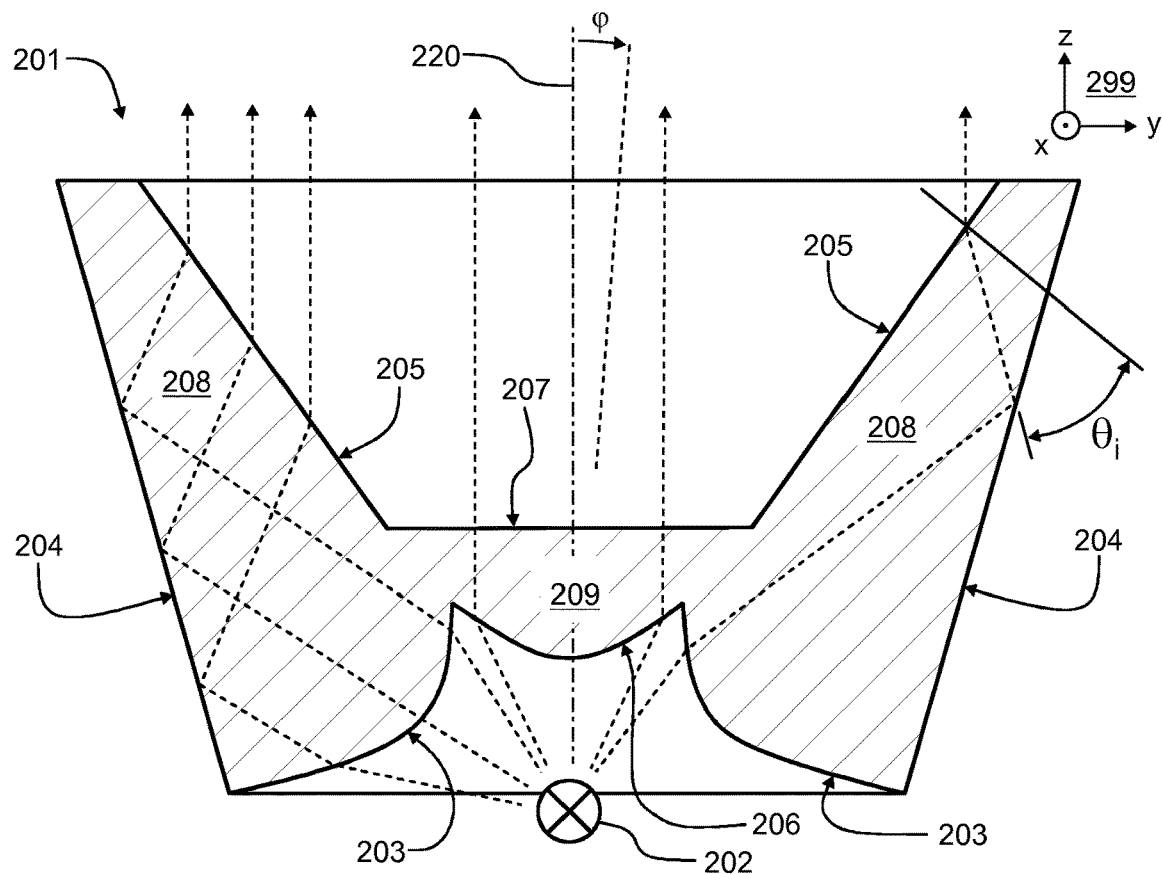
FIG. 2b illustrates the principle of operation of the optical device shown in FIG. 2a, and FIG. 2c shows a light distribution pattern produced with the optical device shown in FIG. 2a, and FIG. 3 illustrates an optical device according to an exemplifying and non-limiting embodiment.

FIG. 2a shows a section view of an optical device 201 according to an exemplifying and non-limiting embodiment. The geometric section plane is parallel with the yz-plane of a coordinate system 299. The optical device 201 is arranged to modify a distribution of light produced by a light source 202. The optical device 201 and the light source 202 constitute an illumination device according to an exemplifying and non-limiting embodiment. Mechanical support structures that support the optical device 201 and the light source 202 are not shown in FIG. 2a.

The light source 220 may comprise for example one or more light emitting diodes "LED", one or more filament lamps, or one or more gas-discharge lamps. The optical device 201 is made of transparent material whose refractive index is greater than one. The transparent material can be for example acrylic plastic, polycarbonate, optical silicone, or glass. The method of manufacture of the optical device 201 can be for example mold casting. The optical device 201 can be, for example but not necessarily, rotationally symmetric with respect to a geometric line 220. In this exemplifying case, the light source 202 is mechanically supported so that the light source 202 is located on the geometric optical axis of the optical device 201. For another example, it is also possible that the optical device has a shape that is elongated in the x-direction of the coordinate system 299. In this exemplifying case, the optical device is suitable for modifying a distribution of light produced by an elongated light source, e.g. fluorescent tube or a plurality of LEDs arranged to constitute a straight line.

The optical device 201 comprises a reflector-section 208 and a lens-section 209 whose edge portions join the reflector-section 208. The reflector-section 208 comprises a light-ingress surface 203 for receiving light from the light source 202. The reflector-section 208 comprises a reflector surface 204 for reflecting the light received through the light-ingress surface 203 so that total internal reflection "TIR" takes place when the light arrives at the reflector surface 204. The reflector-section 208 comprises a light-egress surface 205 for the reflected light. Some of light beams radiated by the light source 202 are depicted with dashed-line arrows in FIG. 2a. The light-ingress surface 203, the reflector surface 204, and the light-egress surface 205 of the reflector-section 208 are shaped so that an angle of incidence $\theta_i$ of the reflected light at the light-egress surface 205 is substantially a polarization angle when the light source 202 is located at a predetermined position with respect to the optical device 201, i.e. at the position shown in FIG. 2a. The polarization angle is also known as Brewster's angle. As shown in FIG. 2a, the angle of incidence $\theta_i$ is between a beam of the light arriving at the light-egress surface 205 and a geometric normal of the light-egress surface 205. The polarization angle is an angle of incidence at which a p-polarized component of the light is transmitted through the light-egress surface 205 without being reflected by the light-egress surface 205, and light reflected off the light-egress surface 205 comprises s-polarized light only. The p-polarized component of the light is linearly polarized with a polarization direction lying in a geometric plane of incidence that is defined by the geometric normal of the light-egress surface 205 and the beam of the light arriving at the light-egress surface 205. In the exemplifying case shown in FIG. 2a, the geometric plane of incidence related to the angle of incidence $\theta_i$ is the geometric section plane that is parallel with the yz-plane of the coordinate system 299. The s-polarized light is linearly polarized with a polarization direction perpendicular to the geometric plane of incidence.

Figure 1A:
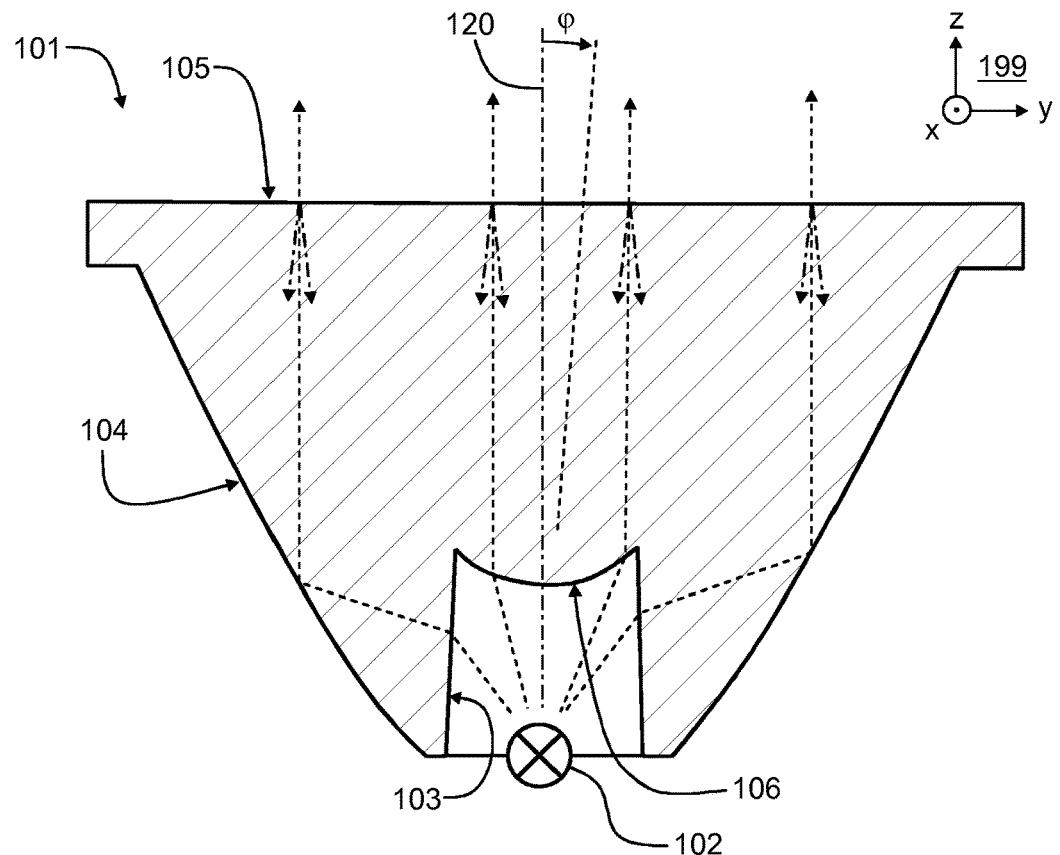
FIG. 1a illustrates an optical device according to the prior art for modifying light distribution and FIG. 1b shows a light distribution pattern produced with the optical device shown in FIG. 1a, FIG. 2a illustrates an illumination device comprising an optical device according to an exemplifying and non-limiting embodiment.
Figure 1B:
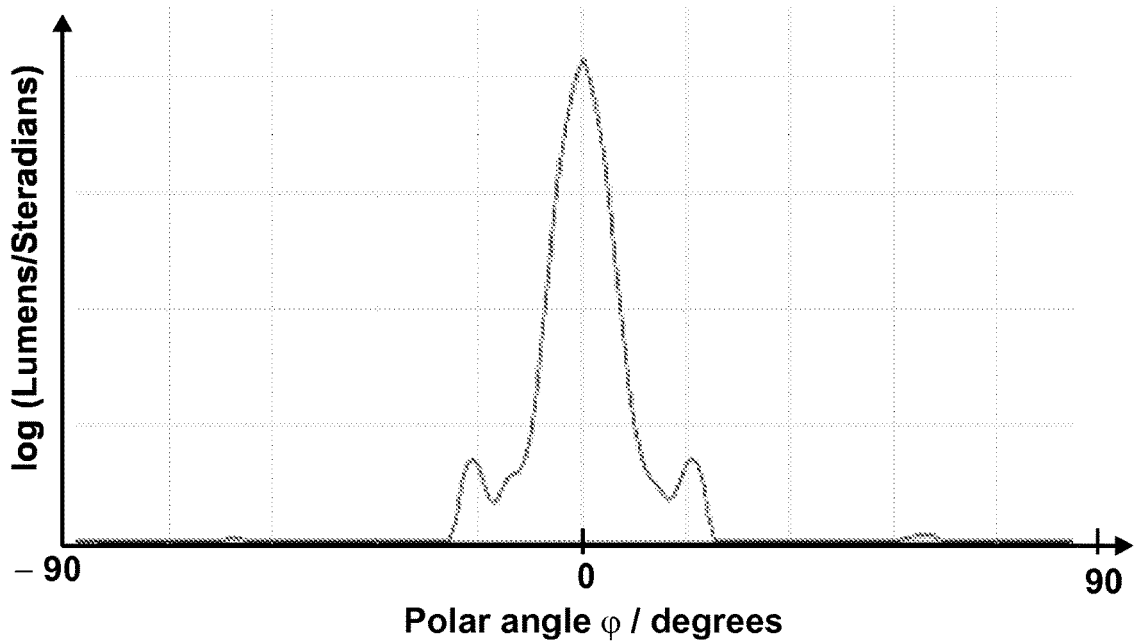
Figure 2B:
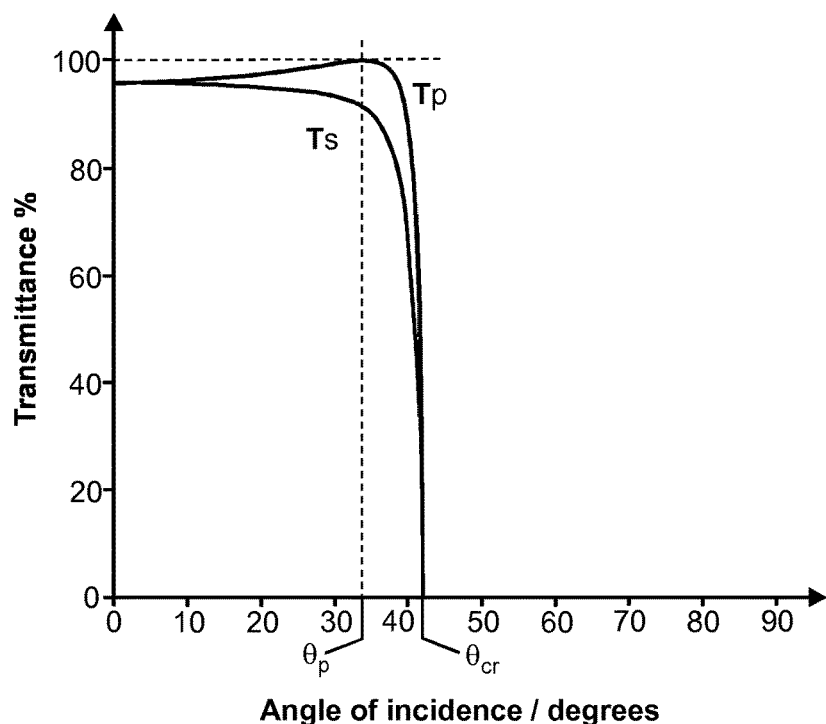
Figure 2C:
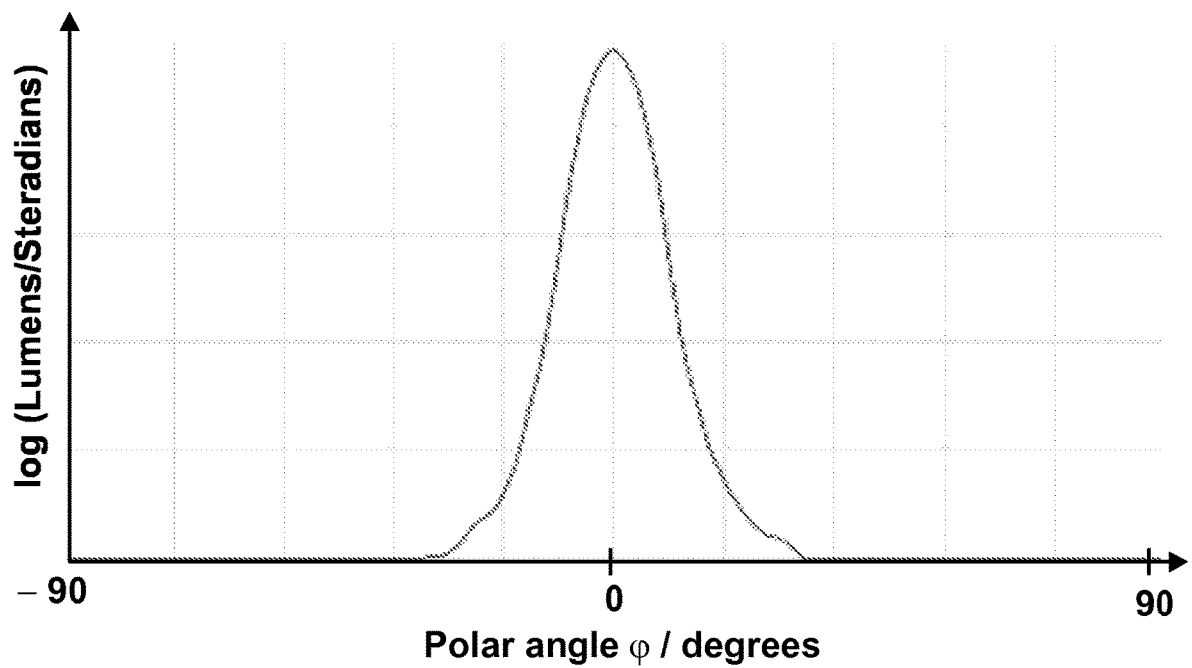

FIG. 2b shows the transmittance Tp of p-polarized light and the transmittance Ts of s-polarized light as functions of the angle of incidence in a glass-to-air interface. As shown by FIG. 2b, the transmittance Tp of p-polarized light is about 100% at the polarization angle $\theta_p$. A total internal reflection takes place at and above a critical angle $\theta_{cr}$, and thereby the transmittances Tp and Ts are zero at and above the critical angle $\theta_{cr}$. As the s-polarized light represents only a small portion of the light arriving at the light-egress surface 205, the amount of light reflected off the light-egress surface 205 can be, in many cases, minimized by selecting the incident angle $\theta_i$ to be the polarization angle $\theta_p$. FIG. 2c shows the light distribution pattern produced with the optical device 201 as a function of a polar angle φ. The polar angle φ is presented in FIG. 2a. As shown in FIG. 2c, the light distribution pattern is substantially free from side peaks of the kind shown in FIG. 1b.

In the exemplifying optical device 201 illustrated in FIG. 2a, a section between the light-ingress surface 203 and the geometric plane of incidence is convex for collimating beams of the light received through the light-ingress surface 203 and lying in the geometric plane of incidence. In FIG. 2a, the collimation is illustrated with dashed-line arrows depicting light beams. In the exemplifying optical device 201 illustrated in FIG. 2a, a section between the reflector surface 204 and the geometric plane of incidence is straight and a section between the light-egress surface 205 and the geometric plane of incidence is straight. It is however also possible to use different shapes for achieving a situation where an angle of incidence at a light egress surface of a reflector-section of an optical device is the polarization angle. The shapes can be designed for example with the aid of beam-optical computer simulations.

In the exemplifying optical device 201 illustrated in FIG. 2a, a light ingress surface 206 of the lens-section 209 is convex for collimating light received through the light-ingress surface of the lens-section and a light-egress surface 207 of the lens-section is substantially planar.

In an optical device according to an exemplifying and non-limiting embodiment, the light-ingress surface 203, the reflector surface 204, and the light-egress surface 205 of the reflector-section 208 are shaped so that the angle of incidence $\theta_i$ of the reflected light at the light-egress surface 205 is substantially the polarization angle on the whole light-egress surface 205 through which all the reflected light exits the optical device, when the light source 202 is located at the predetermined position with respect to the optical device 201, i.e. at the position shown in FIG. 2a.

In an optical device according to an exemplifying and non-limiting embodiment, the light-ingress surface 203, the reflector surface 204, and the light-egress surface 205 of the reflector-section 208 are shaped so that the angle of incidence $\theta_i$ is substantially the polarization angle on at least 90% of the light-egress surface 205 through which all the reflected light exits the optical device, when the light source 202 is located at the predetermined position with respect to the optical device 201, i.e. at the position shown in FIG. 2a.

In an optical device according to an exemplifying and non-limiting embodiment, the light-ingress surface 203, the reflector surface 204, and the light-egress surface 205 of the reflector-section 208 are shaped so that the angle of incidence $\theta_i$ is substantially the polarization angle on at least 75% of the light-egress surface 205 through which all the reflected light exits the optical device, when the light source 202 is located at the predetermined position with respect to the optical device 201, i.e. at the position shown in FIG. 2a.

Figure 3:
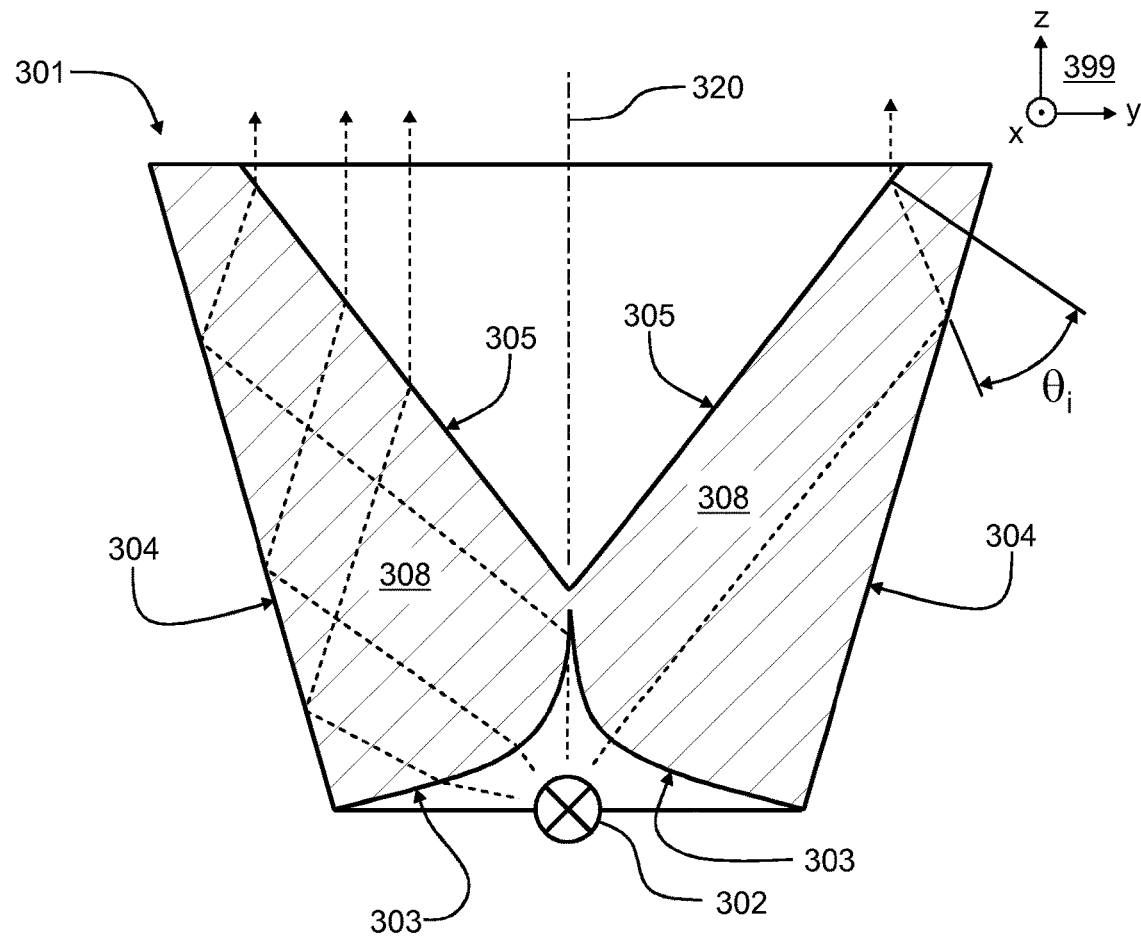

FIG. 3 shows a section view of an optical device 301 according to an exemplifying and non-limiting embodiment. The geometric section plane is parallel with the yz-plane of a coordinate system 399. The optical device 301 is arranged to modify a distribution of light produced by a light source 302. The optical device 301 and the light source 302 constitute an illumination device according to an exemplifying and non-limiting embodiment. Mechanical support structures that support the optical device 301 and the light source 302 are not shown in FIG. 3. The optical device 301 is made of transparent material whose refractive index is greater than one. The transparent material can be for example acrylic plastic, polycarbonate, optical silicone, or glass. The method of manufacture of the optical device 301 can be for example mold casting. The optical device 301 can be, for example but not necessarily, rotationally symmetric with respect to a geometric line 320. In this exemplifying case, the light source 302 is mechanically supported so that the light source 302 is located on the geometric optical axis of the optical device 301. For another example, it is also possible that the optical device has a shape that is elongated in the x-direction of the coordinate system 399.

The optical device 301 comprises a reflector-section 308 that comprises a light-ingress surface 303 for receiving light from the light source 302. The reflector-section 308 comprises a reflector surface 304 for reflecting the light received through the light-ingress surface 303 so that total internal reflection "TIR" takes place when the light arrives at the reflector surface 304. The reflector-section 308 comprises a light-egress surface 305 for the reflected light. Some of light beams radiated by the light source 302 are depicted with dashed-line arrows in FIG. 3. The light-ingress surface 303, the reflector surface 304, and the light-egress surface 305 are shaped so that an angle of incidence $\theta_i$ of the light arriving at the light-egress surface 305 is substantially the polarization angle when the light source 302 is located at a predetermined position with respect to the optical device 301, i.e. at the position shown in FIG. 3. As the angle of incidence $\theta_i$ at the light-egress surface 305 is substantially the above-mentioned polarization angle, unwanted reflections at the light-egress surface 305 can be reduced and thereby unwanted scattering of light is reduced while having good transmitting efficacy.

The specific examples provided in the description given above should not be construed as limiting the scope and/or the applicability of the appended claims. Lists and groups of examples provided in the description given above are not exhaustive unless otherwise explicitly stated.

What is claimed is:

1. An optical device for modifying a light distribution, the optical device being a single piece made of transparent material, the optical device comprising:
    a reflector-section comprising:
        a light-ingress surface configured to receive light from a light source,
        a reflector surface configured to reflect, based on total internal reflection, the light received through the light-ingress surface, and
        a light-egress surface for the reflected light,
    wherein the light-ingress surface, the reflector surface, and the light-egress surface are shaped so that, when the light source is at a predetermined position with respect to the optical device, an angle of incidence of the reflected light arriving at the light-egress surface is substantially a polarization angle at which a p-polarized component of the reflected light is transmitted through the light-egress surface without being reflected by the light-egress surface, the angle of incidence being between a beam of the reflected light and a geometric normal of the light-egress surface, and a polarization direction of the p-polarized component of the reflected light being parallel with a geometric plane of incidence defined by the geometric normal of the light-egress surface and the beam of the reflected light.

2. The optical device according to claim 1, wherein the light-ingress surface, the reflector surface, and the light-egress surface of the reflector-section are shaped so that the angle of incidence is substantially the polarization angle on at least 75% of the light-egress surface through which all the reflected light exits the optical device, when the light source is located at the predetermined position with respect to the optical device.

3. The optical device according to claim 1, wherein a section between the light-ingress surface of the reflector-section and the geometric plane of incidence is convex for collimating beams of the light received through the light-ingress surface of the reflector-section and lying in the geometric plane of incidence.

4. The optical device according to claim 1, wherein a section between the reflector surface and the geometric plane of incidence is straight.

5. The optical device according to claim 1, wherein a section between the light-egress surface of the reflector-section and the geometric plane of incidence is straight.

6. The optical device according to claim 1, further comprising a lens-section having edge portions that join the reflector-section.

7. The optical device according to claim 6, wherein a light ingress surface of the lens-section is convex for collimating light received through the light-ingress surface of the lens-section.

8. The optical device according to claim 6, wherein a light-egress surface of the lens-section is substantially planar.

9. The optical device according to claim 1, wherein the optical device is rotationally symmetric with respect to a geometric line.

10. The optical device according to claim 1, wherein the transparent material is one of the following: acrylic plastic, polycarbonate, optical silicone, and glass.

11. An illumination device comprising:
a light source; and
an optical device configured to modify a distribution of light produced by the light source, the optical device being a single piece made of transparent material and comprising a reflector-section comprising:
a light-ingress surface configured to receive light from the light source,
a reflector surface configured to reflect, based on total internal reflection, the light received through the light-ingress surface, and
a light-egress surface for the reflected light,
wherein the light source is located with respect to the optical device, and the light-ingress surface, the reflector surface, and the light-egress surface are shaped so that so that an angle of incidence of light arriving at the light-egress surface from the reflector surface is a polarization angle at which a p-polarized component of the light is transmitted through the light-egress surface without being reflected by the light-egress surface, the angle of incidence being between a beam of the light and a geometric normal of the light-egress surface, and a polarization direction of the p-polarized component of the light being parallel with a geometric plane of incidence defined by the geometric normal of the light-egress surface and the beam of the light.

12. A mold having a form configured to manufacture, by mold casting, a transparent piece constituting an optical device configured to modify a light distribution, the optical device comprising
a reflector-section comprising:
a light-ingress surface configured to receive light from a light source,
a reflector surface configured to reflect, based on total internal reflection, the light received through the light-ingress surface, and
a light-egress surface for the reflected light,
wherein the light-ingress surface, the reflector surface, and the light-egress surface are shaped so that, when the light source is at a predetermined position with respect to the optical device, an angle of incidence of the reflected light arriving at the light-egress surface is substantially a polarization angle at which a p-polarized component of the reflected light is transmitted through the light-egress surface without being reflected by the light-egress surface, the angle of incidence being between a beam of the reflected light and a geometric normal of the light-egress surface, and a polarization direction of the p-polarized component of the reflected light being parallel with a geometric plane of incidence defined by the geometric normal of the light-egress surface and the beam of the reflected light.

13. The optical device according to claim 3, wherein a section between the reflector surface and the geometric plane of incidence is straight.

14. The optical device according to claim 3, wherein a section between the light-egress surface of the reflector-section and the geometric plane of incidence is straight.

15. The optical device according to claim 4, wherein a section between the light-egress surface of the reflector-section and the geometric plane of incidence is straight.

16. The optical device according to claim 7, wherein a light-egress surface of the lens-section is substantially planar.

17. The optical device according to claim 2, wherein a section between the light-ingress surface of the reflector-section and the geometric plane of incidence is convex for collimating beams of the light received through the light-ingress surface of the reflector-section and lying in the geometric plane of incidence.

18. The optical device according to claim 2, wherein a section between the reflector surface and the geometric plane of incidence is straight.

19. The optical device according to claim 2, wherein the optical device is rotationally symmetric with respect to a geometric line.

20. The optical device according to claim 3, wherein the optical device is rotationally symmetric with respect to a geometric line.

* * * * *